United States Patent [19]
Doeden et al.

[11] Patent Number: 5,112,166
[45] Date of Patent: May 12, 1992

[54] SELF-INDEXING POWER FEED RIB BOLT DRILL

[75] Inventors: Douglas D. Doeden, Hicksville, Ohio; Arvid L. Kalnoski, Issaquah, Wash.

[73] Assignee: The Boeing Company, Seattle, Wash.

[21] Appl. No.: 589,742

[22] Filed: Sep. 28, 1990

[51] Int. Cl.$^5$ .............................. B23B 45/14
[52] U.S. Cl. .................... 408/1 R; 408/99; 408/103
[58] Field of Search .......... 408/1 R, 95, 99, 130, 408/100, 103, 111

[56] References Cited

U.S. PATENT DOCUMENTS

| | | | |
|---|---|---|---|
| 793,146 | 6/1905 | Nolan | 408/103 |
| 3,679,320 | 7/1972 | Bohorquez et al. | 408/99 |
| 4,679,969 | 7/1987 | Riley | 408/103 |

OTHER PUBLICATIONS

Doler Catalog, p. 3.3.

Primary Examiner—Daniel W. Howell

[57] ABSTRACT

The invention relates to a drilling apparatus that can position a drill at the precise center between two overlapping flanges and clamp at that position while a self feeding drill drills a hole.

12 Claims, 6 Drawing Sheets

SELF-INDEXING POWER FEED RIB BOLT DRILL

BACKGROUND OF THE INVENTION

This is invention relates to the apparatus for drilling a hole at a precisely predetermined position at the intersection of two structural members and more particularly to a self-indexing apparatus that can position a drill at the precise center between two overlapping flanges of a wing stringer and rib and can clamp at that position while a self feeding drill drills the hole at the precisely predetermined position at the overlapping flanges of the two structural members.

Airplane wings are built by fastening a stringer, which is a Z-shaped or U-shaped structural member, to the wing skin, and then fastening the ribs which run laterally across the span of the wing onto the stringers. The ribs, in turn, are fastened to longitudinally extending wing spars. The connection of the wing ribs to the stringers is done by drilling a hole through the intersections of the stringer flanges and the horizontal leg of the rib. Fasteners are inserted in the holes and are tightened to provide a secure attachment at every intersection of the ribs to securely fasten the wing skin to the wing frame.

The placement of the hole at the intersection of the rib and the stringer is important for the achievement of maximum strength and to insure that the fastener heads are not in contact with the rib flange which might cause a fatigue problem with the fastener. In the past, placement of the hole at the intersection has been achieved by clamping a drill guide which in place and using it to guide a hand held drill to drill a hole through the overlapping flanges. This method is generally acceptable and always produces accurate results unless the drill guide is improperly placed or slips after being properly placed. Also, if the wrong drill guide is used, or the guide becomes damaged so that it no longer properly positions the hole at the right location the hole may not be properly positioned. To guard against occurrences of this nature, the holes are routinely checked by quality control to insure that they are properly placed. Two instruments for measuring the position of the hole at the intersection of a flange and a rib are disclosed in U.S. patent application Ser. No. 555,869 filed on Jul. 20, 1990.

The procedures to repair an improperly drilled hole are time consuming and expensive, and the repair adds weight to the airplane which reduces its operating efficiency. Therefore it is far preferable to insure that the hole is drilled at the correct location in the first instance so that no repair is necessary.

Accordingly, there has long been a need in the airplane manufacturing art for an apparatus which will correctly position and accurately drill a hole at the intersection of a rib and a stringer, which can be used in most of the locations in the wing. The apparatus should be easy and fast to operate and should clamp securely in position to eliminate the possibility of inadvertent movement from the correct position.

SUMMARY OF THE INVENTION

Accordingly, it is an object of this invention to provide an apparatus for precisely positioning and drilling a hole at the intersection of a rib and stringer which routinely produces extremely accurate results in day to day use in a factory. It is another object of the invention to provide such an apparatus which reduces the time and effort to correctly position and drill the hole. It is yet another object of the invention to provide such an apparatus that is easily movable by hand into very confined positions and which is very rugged to withstand the rough handling that production equipment receives in a factory. It is still another object of the invention to provide a method for correctly and accurately locating and drilling a hole at the intersection of a rib and stringer which is quickly practiced with minimum effort by the operator, and has a high probability of producing holes positioned within tolerance.

These and other objects of the invention are attained by an apparatus having a clamp body on which are mounted several convenient positioning stops which enable the apparatus to be accurately positioned and clamped on a stringer flange by a power operated clamp means. A pair of support posts on the clamp body support a thrust cylinder to which a power drill is attached. The power drill has a right angle drive to which the drill bit is held to fit within the restricted confines between the upper and lower chords of the rib. The power feed for the drill operates by the same switch that controls the power clamps that hold the apparatus in position on the stringer flange.

DESCRIPTION OF THE DRAWINGS

The invention and its many attendant objects and advantages will become more apparent upon reading the following detailed description of the preferred embodiment in conjunction with the drawings, wherein.

DESCRIPTION OF THE PREFERRED EMBODIMENT

Figures 1, 2:
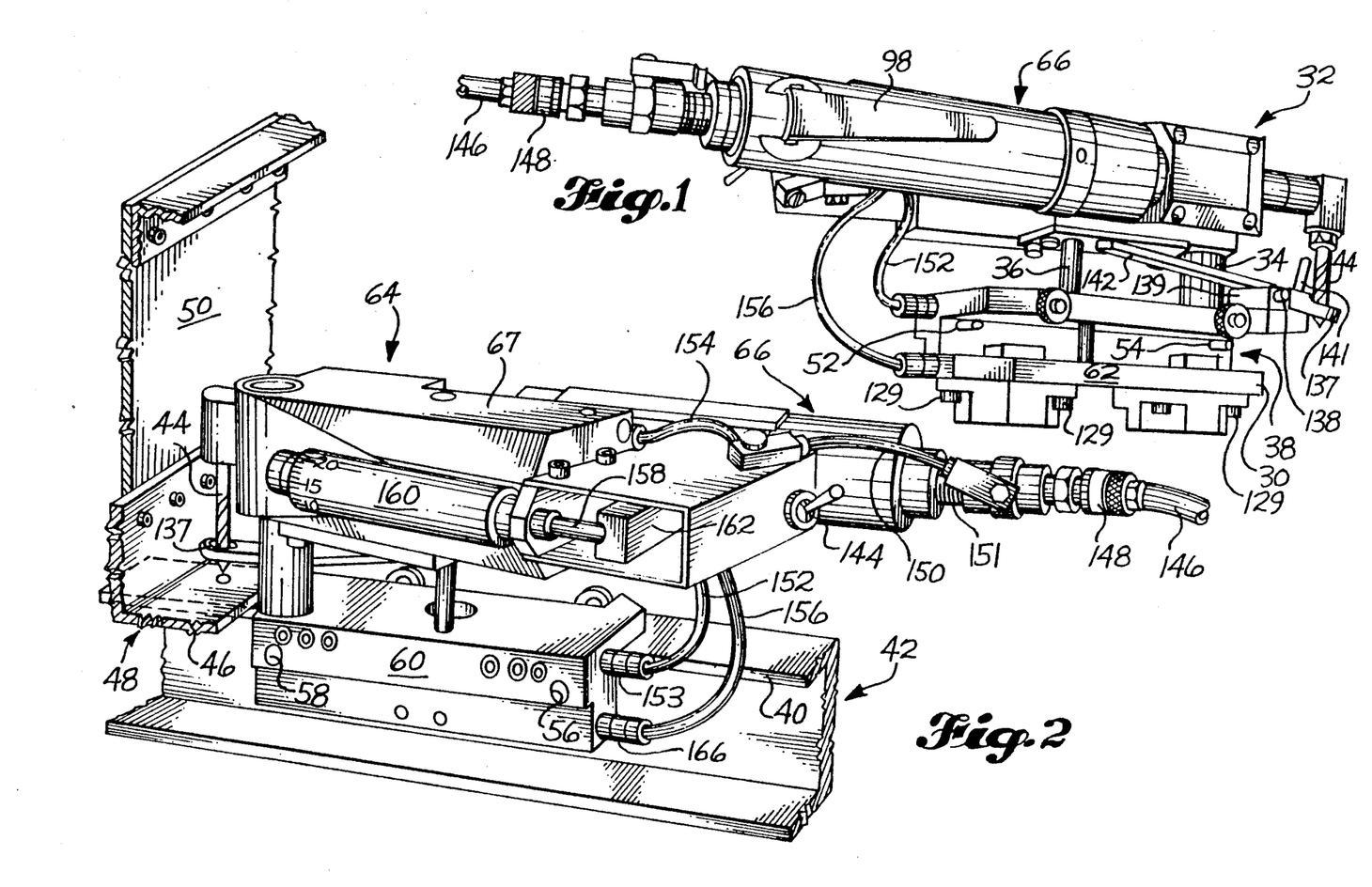
FIG. 1 is a perspective view of a self-indexing power feed rib bolt drill according to the invention.
FIG. 2 is a perspective view of the apparatus shown in FIG. 1 clamped in place on a stringer and prepared to drill a hole through the intersection of a rib and the stringer.

Turning now to the drawings, wherein like reference numerals designate identical or corresponding parts, and more particularly to FIG. 1 thereof, a self-indexing power feed rib bolt drill is shown having a clamp body 30 to which an upper power unit 32 is connected by a front post 34 and a rear post 36. The clamp body 32 has a longitudinal slot 38 to receive a flange 40 of a stringer 42 shown in FIG. 2.

As shown in FIG. 2, the apparatus is designed to precisely position a drill bit 44 at a predetermined position at the intersection of the flange 40 of the stringer 42 and a leg 46 of a rib chord 48 which is riveted to the rib 50. The position of the drill bit 44 crosswise of the stringer flange 40 can be set by a pair of set screws 52 and 54 which are threaded into the clamp body 30 and protrude into the longitudinal slot 38. The length of the set screws 52 and 54 projecting into the longitudinal slot 38 can be adjusted by screwing the set screws 52 and 54 into or out of the threaded holes in which they are held in the clamp body 30 by an allen wrench which can be fitted into the screws 52 and 54 through access holes 56 and 58 in the blank side 60 of the clamp body 30 opposite the side 62 in which the slot 38 opens.

Figure 3:
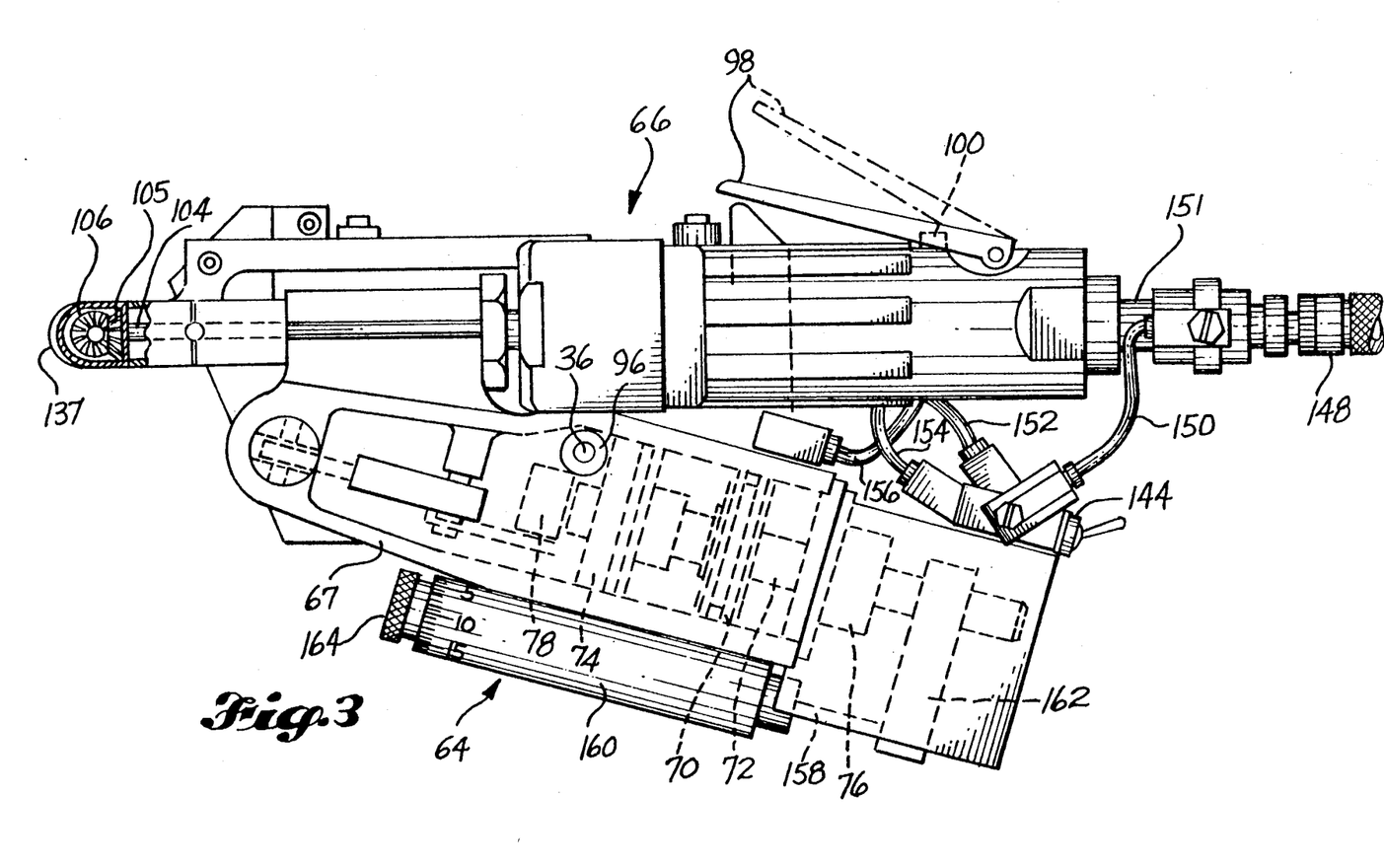
FIG. 3 is a plan view of the apparatus shown in FIG. 1.

As shown in FIG. 2 and even more clearly in FIG. 3, the power unit 32 which the posts 34 and 36 support includes a thrust unit 64 to which a drill motor 66 is attached and by which it is supported.

Figure 4:
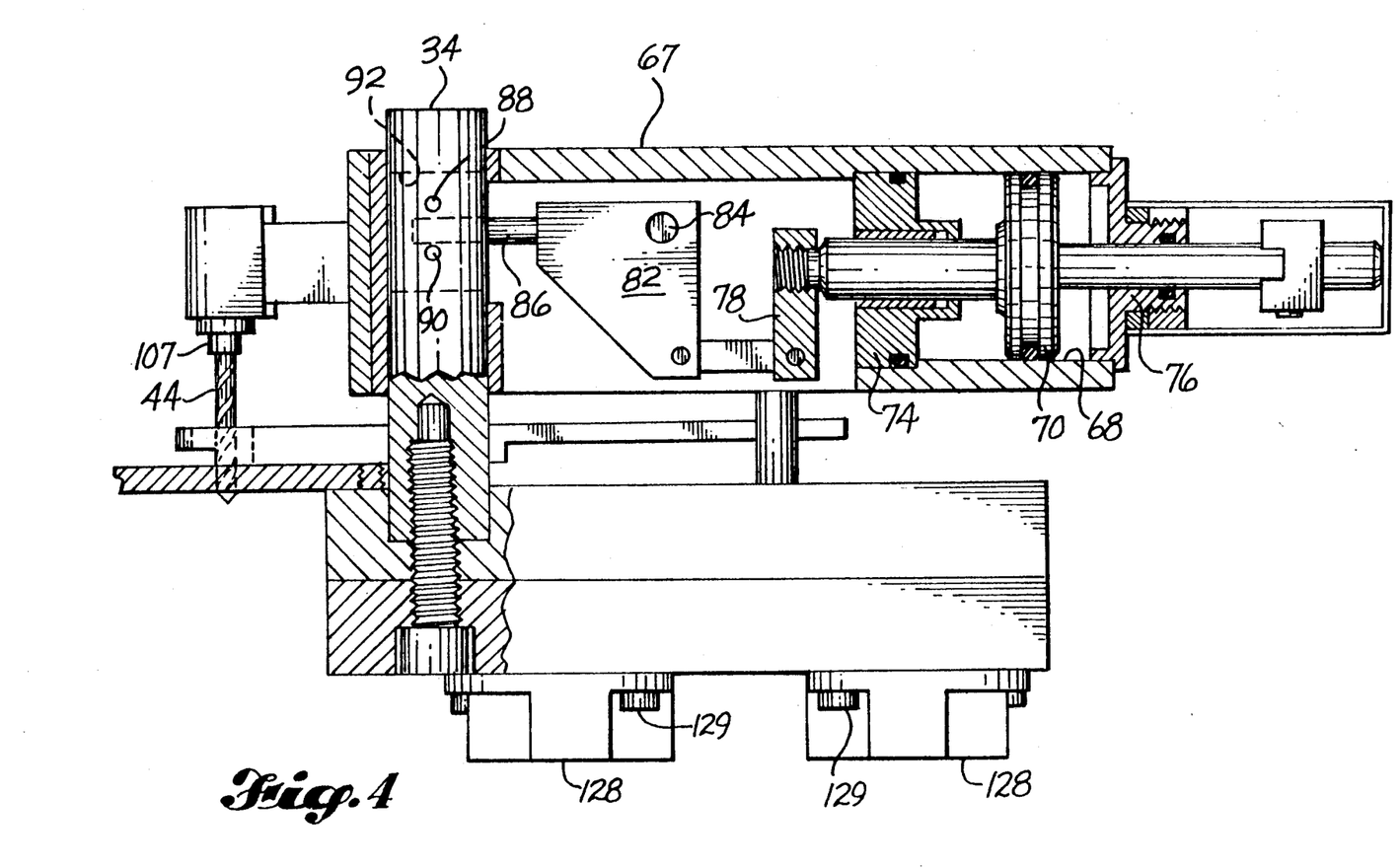
FIG. 4 is a sectional elevation of the apparatus shown in FIG. 1.
Figure 5:
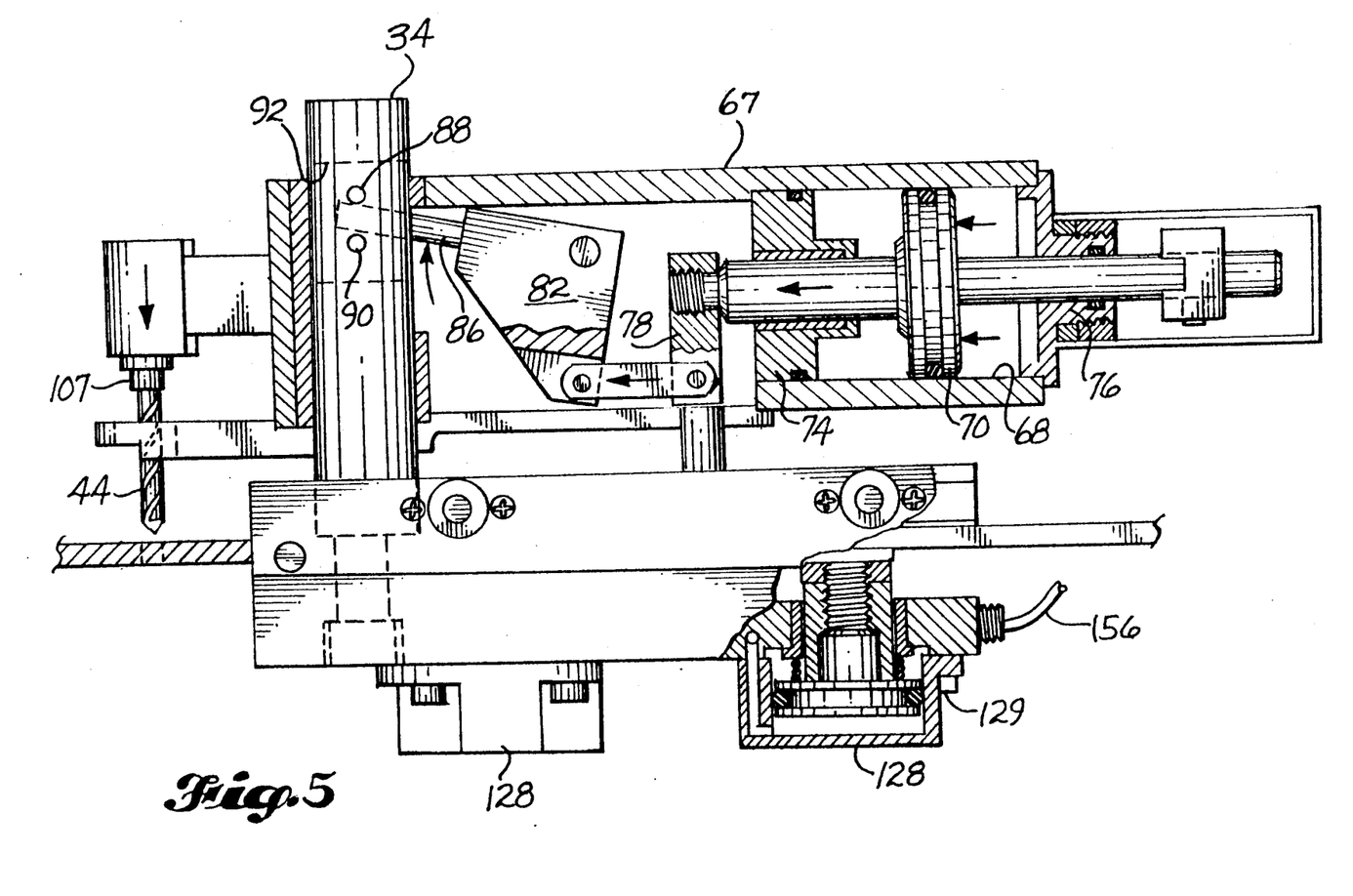
FIG. 5 is a sectional elevation of the apparatus shown in FIG. 1 at the limit of its stroke.

Both the drill motor 66 and the thrust unit 64 of the power unit 32 are operated by compressed air since this apparatus is intended for use in a factory where plant air is available for powering such equipment. The thrust unit 64 has a thrust cylinder housing 67 containing a thrust cylinder 68. A piston 70 in the thrust cylinder 68 has a piston rod 72 which travels in a pair of guides 74 and 76. The piston rod 72 is threaded into an arm 78, best shown in FIG. 4, which in turn is pinned to a link 80 connected to a bell crank 82. The bell crank 82 is pivoted in the thrust cylinder housing 67 at a pivot pin 84 so that the bell crank 82 can rotate about the pivot pin 84 when the thrust piston 70 moves forward. An actuator rod 86 extends forwardly from the bell crank 82 between two pins 88 and 90 extending across a bore 92 through the front post 34. The thrust cylinder housing 67 slides vertically on the front post 34 in a bronze bushing 94 and slides on the rear post 36 in a similar bronze bushing 96. This arrangement provides vertical motion of the thrust unit 64 and its attached drill motor 66 when the piston 70 moves forward under air pressure behind the piston in the thrust cylinder 68, as shown in FIG. 5.

The drill motor 66 is powered by air pressure controlled by a lever 98 which depresses a button 100 when the lever 98 is depressed. The button controls the flow of air under pressure through a fitting 102 to a turbine (not shown) in the drill motor 66 to rotate a drive shaft 104. The drive shaft 104 is connected to a spiral bevel gear 105 which drives a corresponding spiral bevel gear 106 to drive a threaded connection 107 or other device for connecting the drill bit 44 to the right angle drive.

Figure 6:
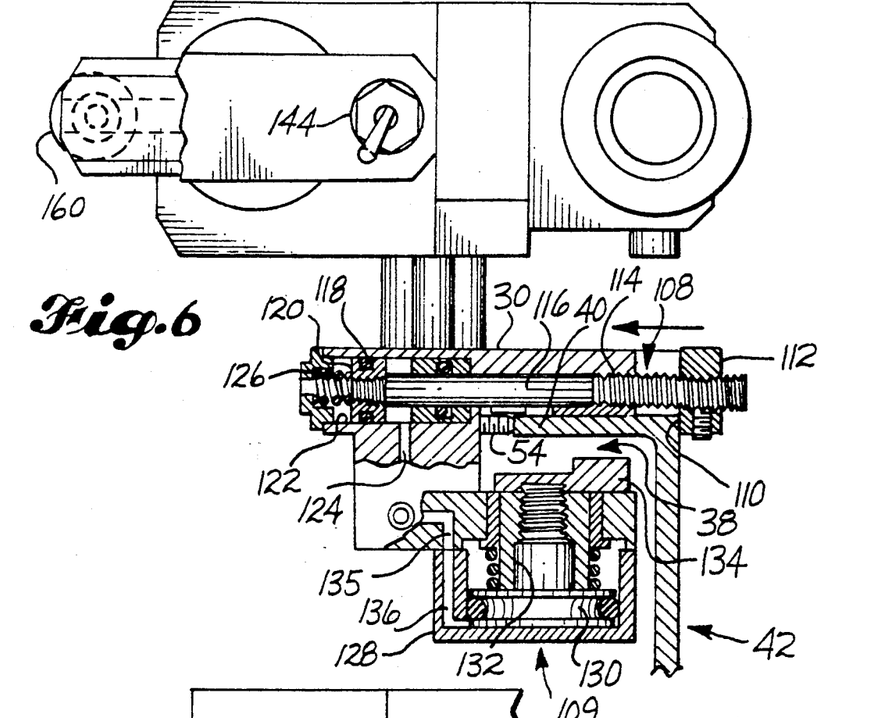
FIG. 6 is a sectional elevation of a portion of the apparatus shown in FIG. 1 showing details of the clamp.
Figure 7:
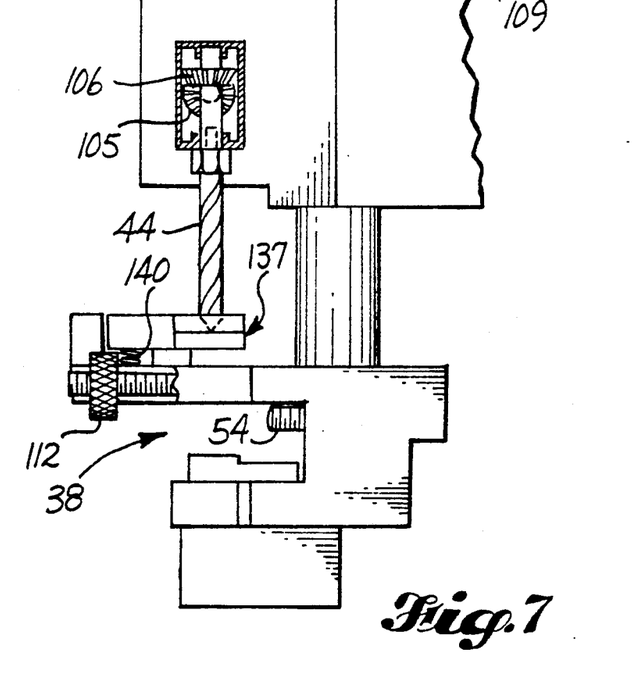
FIG. 7 is a sectional elevation of a portion of the apparatus shown in FIG. 1 showing details of the right angle drive and the clamp.

Turning now to FIG. 6, the stringer 42 is shown clamped in the clamp body by a pull-in clamp 108 and a gripping clamp 109. The pull-in clamp 108 engages a corner edge 110 of the stringer flange 40 with a knob 112 which is threadedly engaged on a threaded end 114 of a piston rod 116 mounted in the clamp body 30. A piston 118 is threadedly secured to a threaded end 120 of the piston rod 116 and travels in a cylinder 122 under influence of air under pressure delivered to the cylinder 122 through an air passage 124 in the clamp body 30 which pressurizes the cylinder 122 to move the piston 118 to move the piston and piston rod 116 to the left in FIG. 6 to engage the knob 112 with the corner 110 of the stringer flange 40 to pull the stringer flange 40 fully into the longitudinal slot 38 up against the set screws 52 and 54. The knob 112 is adjustable along the length of the threaded section 114 to insure that the travel of the piston 118 and the cylinder 122 is sufficient to permit insertion of the stringer flange 40 into the slot 38 and for the knob 112 to engage the corner 110 before the piston 118 bottoms against the end of the cylinder 122. A spring 126 returns the piston 118 and piston rod 116 to the right after air pressure though the passage way 124 is relieved.

The gripping clamp 109 includes two cylinders 128, each connected to the underside of the clamp body 30, by screws 129. A piston 130 in each of the cylinders 128 has a piston rod 132 with a threaded end which is threaded into a clamp pad 134 which moves up to engage the underside of the stringer flange 40 when the piston is extended upwardly. An air passage 135 in the clamp body 30 registers with a similar air passage 136 in the cylinder 128 to provide means for delivering air under pressure to the bottom side of the piston 130 to actuate the clamp.

As shown in FIG. 1, a stand-off 137 is pivotally mounted on a pivot pin 138 on a block 139 mounted on the clamp body 30 adjacent the front post 34. A spring 140 on the back side of the pivot pin 138 biases the stand-off to rotate its front end downward, and a set screw 141 limits this downward rotation at the front end of the stand-off to a predetermined extent. The rear end of the stand-off is extended to form a lever 142 which may be depressed by the operator to lift the front end when it must be raised to clear some obstacle.

In operation, when a hole is to be drilled at the intersection of a particular stringer 42 and a particular rib 50, the operator aligns the longitudinal slot 38 with the stringer flange 40 and slips the clamp body 30 onto the flange 40 until the ends of the set screws 52 and 54 engage the free edge of the flange 40. The operator then slides the apparatus along the flange 40 until the end of the stand-off 137 engages the upright face of the rib chord 48.

The distance between the upright face of the rib chord 48 and the drill bit 44 is determined by the position of the front edge of the stand-off 137 and may be adjusted by adjusting the position of the block 139 on the clamp body 30. With the clamp body seated on the stringer flange 40, and the set screws 52 and 54 against the free edge of the flange 40, and with the front edge of the stand-off 137 abutted against the upright face of the rib chord 48, the drill bit 44 is precisely positioned where the hole is to be drilled.

Figure 8:
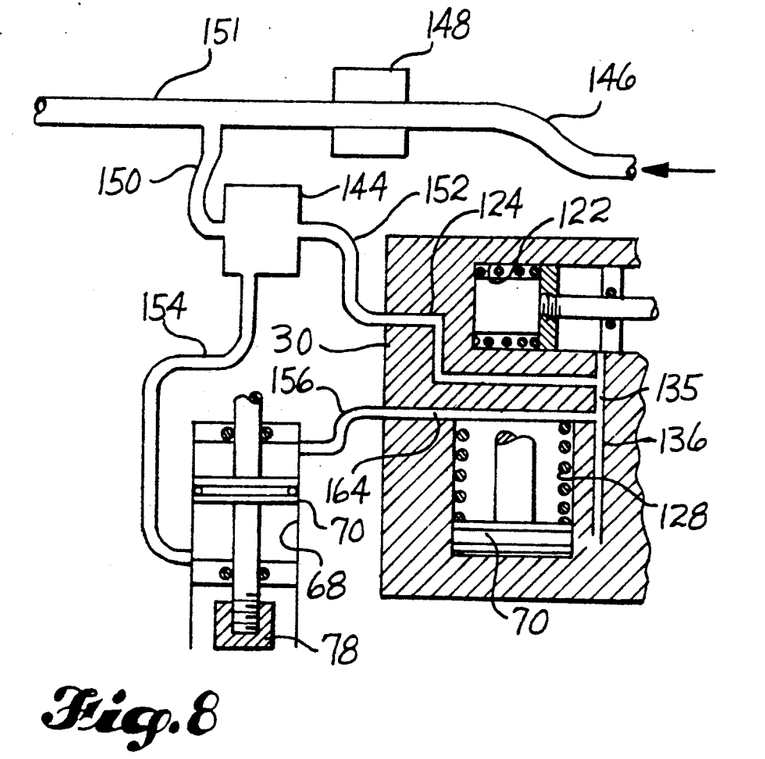
FIG. 8 is a schematic diagram of the pneumatic control and actuation system for the device illustrated in FIGS. 1–7.

With the apparatus positioned and clamped firmly in place, the operator now merely flips a toggle switch 144 which pressurizes the air circuit of the apparatus best shown in FIG. 8, from an air supply line 146 which is connected by a quick disconnect coupling 148 to the apparatus. An air line 150 connected to the drill motor main air supply pipe 151 runs to the toggle switch 144 from which it is distributed on the down stream side of the switch 144 via an air line 152. Air line 152 is connected to a fitting 153 leading to the air passage 124 by which the cylinder 122 is pressurized to actuate the pull-in clamp 108. The air passage 124 is connected internally within the clamp body 30 to the air passage 135 which connects to the air passage 136 in the gripping clamp cylinder 128 by which the cylinder 128 is pressurized. The connection of the air passage 135 downstream of the cylinder 122 provides a slight delay between operation of the gripping clamp after the operation of the pull-in clamp 108 so that the flange 40 will be pulled fully into the slot 38 before the gripping clamp 109 clamps the flange in the slot 38.

An air passage 164 is connected to the air passage 135 within the clampbody 30 and leads to a fitting such as a threaded port in the side of the body 39 to which a connector 166 can be fastened to couple the air line 156 which leads to the thrust cylinder at the rear face of the piston 70. The placement of the line 156 downstream of the cylinders 122 and 128 provides a slight delay in the initiation of the movement of the piston 70 relative to the closing of the clamps 108 and 109.

Momentarily after the clamps 108 and 109 have been actuated, pressure from the air line 156 pressurizes the cylinder 68 of the power feed system to begin moving the thrust unit 64 and the attached drill motor 66 down toward the stringer flange 40 and the overlapping leg 46 of the rib chord 48. This downward movement is controlled by a hydraulic dash pot 160, shown in FIGS. 2 and 3, having a dash pot rod 158 connected by an arm 162 to the piston rod 72 of the thrust piston 70. The operation of the dash pot is adjustable by a knob 164 which controls a size of an orifice through which hydraulic fluid flows in the dash pot, thereby controlling the speed at which the dash pot rod 158 can move.

When the apparatus is clamped to the stringer flange 40, the operator presses the lever 98, pushing the button 100 to turn on the air to the turbine in the drill motor 66 to drive the drive shaft 104 and thereby drive the drill bit 44. The drill quickly drills a perfectly vertical hole in the precisely predetermined position at the intersection of the stringer flange and the rib chord leg 46.

After the hole is drilled, the operator releases the lever 98 to stop the drilling operation and flips the switch 144 to the "off" position. This releases the pull-in clamp 108 and the gripping clamp 109 and pressurizes the thrust cylinder 68 on the front side of the piston 70 through the air line 154 to push it toward the rear of the thrust cylinder 68, thereby raising the thrust unit 64 and the attached drill motor 66 upward to lift the drill bit out of the hole. The apparatus is then slipped off the stringer flange 40 and is ready to be moved to the next location.

An apparatus is thus disclosed which is capable of precisely positioning and drilling a hole at the intersection of a rib chord leg and a stringer flange to produce a precisely positioned hole at the desired location with great accuracy and reproducability. It is extremely easy to use and greatly reduces operator frustration and fatigue in producing correctly positioned holes. The operation is much faster than the old manual method and operators report full satisfaction with its use.

Obviously numerous modifications and variations of the disclosed embodiment will occur to those skilled in the art in view of this disclosure. Accordingly, it is expressly to be understood that these modifications and variations, and the equivalents thereof, may be practiced while remaining within the spirit and scope of the invention as defined in the following claims, wherein,

We claim:

1. An apparatus for precisely positioning a drill bit and drilling a hole at a precisely predetermined position at an intersection of a stringer and a rib, comprising:
    a clamp having a clamp body and a longitudinal slot therein for receiving a flange of said stringer;
    means in said longitudinal slot for precisely positioning said clamp relative to a free edge of said stringer;
    a drill motor disposed on an axis parallel to said longitudinal slot for powering a drill;
    means for supporting said drill motor on said clamp;
    a right angle drive for driving a drill bit about an axis disposed at 90° to said motor axis and perpendicular to said longitudinal slot;
    a power feed system for forcably moving said motor and said right angle drive toward said clamp to move said drill bit toward a stringer flange held in said clamp;
    a standoff mounted on said clamp and extending therebeyond, intersecting said drill bit axis and extending therebeyond for engaging a flange of said rib to enable said drill bit to be positioned along said stringer flange at a precisely predetermined position from said rib flange;
    said clamp having pull-in means for engaging a top corner edge of said stringer and pulling said stringer flange fully into said longitudinal slot, and gripping means for exerting a gripping force on said stringer flange in said longitudinal slot in a direction parallel to said drill bit axis to hold said apparatus in a fixed and steady position on said stringer while said drill drills a hole through the intersection of said rib and said stringer.

2. An apparatus as defined in claim 1, wherein:
    said positioning means in said longitudinal slot include adjustable stops in said slot for limiting the depth of penetration of said stringer flange into said slot.

3. An apparatus as defined in claim 2, wherein:
    said longitudinal slot is elongated in the direction of said drill motor axis and includes an open side parallel to said motor axis, and a closed blind side parallel to said open side; and
    said adjustable stops include at least two set screws threaded into said clamp body and protruding from the blind side of said slot into said slot at positions spaced therealong to engage said free edge of said stringer when said stringer is inserted into said slot.

4. An apparatus as defined in claim 1, wherein:
    said supporting means includes a thrust cylinder housing to which said drill motor is connected, said thrust cylinder housing having a piston and means for converting axial motion of said piston to motion at right angles thereto toward and away from said longitudinal slot.

5. An apparatus as defined in claim 4, wherein:
    said supporting means further includes two posts mounted on said clamp body and extending therefrom through said thrust cylinder housing, and bearing means in said thrust cylinder housing for slidably receiving said posts for guiding said thrust cylinder housing and said drill attached thereto for parallel movement toward and away from said longitudinal slot in said clamp body.

6. An apparatus as defined in claim 1, wherein:
    said pull-in means includes an air cylinder mounted in said clamp body on an axis extending perpendicular to both said drill bit axis and said drill motor axis, and a piston movable in said pull-in air cylinder, said pull-in piston having corner edge engagement means thereon for engaging said corner edge of said stringer and pulling said stringer flange into said longitudinal slot fully against said positioning means.

7. An apparatus as defined in claim 6, wherein:
    said piston includes a piston rod, a portion of which is threaded; and
    said corner edge engagement means includes an internally threaded member threadedly engaged with said threaded portion of said piston rod, and locking means for securing said threaded member at the desired position along said pistonrod.

8. An apparatus as defined in claim 1, wherein:

said stand-off includes a hole for passage of said drill bit, and means for raising the distal end thereof to clear obstacles in the path of said stand-off.

9. An apparatus as defined in claim 8, wherein:

said distal end raising means includes a pivot pin on which said standoff is pivotally connected to said clamp body, whereby said stand-off may be pressed downwardly at the inner end and the distal end will rise.

10. An apparatus as defined in claim 1, wherein:

said pull-in means and said gripping means are actuated by air cylinders; and said air cylinders are timed to operate in sequence, with said pull-in means operating first, and said gripping means operating after said pull-in means has pulled said stringer into said slot.

11. An apparatus as defined in claim 10, further comprising:

air control means for controlling air feed to said air cylinders and also for controlling air feed to said power feed system; and rate control means for controlling the rate at which said power feed system moves said drill bit toward the stringer flange held in said clamp;

whereby said air cylinders operate first to pull said stringer flange into said longitudinal slot and clamp said stringer flange in said slot, and then said drill bit drills a hole in said stringer flange.

12. A method of precisely positioning a drill bit at a stringer and an overlapping leg of a rib chord, for drilling a hole at said predetermined position, comprising:

inserting said stringer flange in a longitudinal slot in a clamp body, with a free edge of said stringer flange abutting a pair of set screws projecting into said slot from a blind side of said longitudinal slot to correctly position said clamp body crosswise of said stringer flange;

sliding said clamp body along said stringer flange until a stand-off connected to said clamp body engages an upright face of said rib chord to correctly position said clamp body lengthwise along said stringer flange and crosswise of said rib chord;

energizing a pull-in clamp in said clamp body to pull said stringer flange into said slot against said set screws, and energizing a gripping clamp to clamp said stringer flange vertically in said slot;

energizing a power drill feed to feed said drill bit, held in a power drill supported on said clamp body, vertically onto said stringer flange and said rib chord; and energizing said power drill to rotate said drill bit against said stringer flange and said rib chord to drill said hole.

* * * * *